United States Patent
Soualle et al.

(10) Patent No.: US 10,432,253 B2
(45) Date of Patent: Oct. 1, 2019

(54) NOISE DISTRIBUTION SHAPING FOR SIGNALS, PARTICULARLY SPREAD SPECTRUM SIGNALS LIKE CDMA SIGNALS, WITH IMPROVED ROBUSTNESS

(71) Applicant: Airbus Defence and Space GmbH, Taufkirchen (DE)

(72) Inventors: Francis Soualle, Munich (DE); Mathieu Cattenoz, Gentilly (FR)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 0 days.

(21) Appl. No.: 15/872,628

(22) Filed: Jan. 16, 2018

(65) Prior Publication Data
US 2018/0145723 A1  May 24, 2018

Related U.S. Application Data (63) Continuation of application No. PCT/EP2016/066151, filed on Jul. 7, 2016.

(30) Foreign Application Priority Data

Jul. 17, 2015  (EM) .................................. 15002130

(51) Int. Cl.
*H04B 1/10* (2006.01)
*H04B 1/7113* (2011.01)
(Continued)

(52) U.S. Cl.
CPC .......... *H04B 1/7113* (2013.01); *G01S 19/21* (2013.01); *G01S 19/22* (2013.01); *G01S 19/35* (2013.01);
(Continued)

(58) Field of Classification Search
CPC ............... H04B 1/7113; H04B 1/7097; H04B 2001/70715; H04B 17/27; H04B 1/7107; H04B 1/10; G01S 19/21; G01S 19/22; G01S 19/35; H04W 24/02
USPC .......................... 375/351, 229, 232, 350, 346
See application file for complete search history.

(56) References Cited

U.S. PATENT DOCUMENTS 7,260,163 B2  8/2007  Li et al.
9,979,434 B2 * 5/2018  Soualle ................ H04B 1/7097
(Continued)

FOREIGN PATENT DOCUMENTS

EP  14290171.9  6/2014
WO  2004010601  1/2004

OTHER PUBLICATIONS

European Search Report, dated Dec. 17, 2015, priority document.
(Continued)

*Primary Examiner* — Phuong Phu
(74) *Attorney, Agent, or Firm* — Greer, Burns & Crain, Ltd.

(57) ABSTRACT

Noise distribution shaping for signals, particularly for the application in receivers for CDMA signals. An embodiment provides a method for noise distribution shaping for signals comprising the acts of generating a blanking control signal by comparing a received signal comprising transitions with at least one blanking threshold, determining transitions of the received signal and zones around the determined transitions, and generating a transitions control signal comprising the determined transitions and zones, adapting the at least one blanking threshold or the received signal according to an offset value depending on the amplitude of the received signal and on the transitions control signal, and modifying the noise distribution of the received signal by applying blanking of the received signal under control of the blanking control signal.

15 Claims, 7 Drawing Sheets

(51) Int. Cl.
*G01S 19/21* (2010.01)
*H04B 1/7097* (2011.01)
*G01S 19/22* (2010.01)
*G01S 19/35* (2010.01)
*H04B 1/707* (2011.01)

(52) U.S. Cl.
CPC . *H04B 1/7097* (2013.01); *H04B 2001/70706* (2013.01); *H04B 2201/70715* (2013.01)

(56) References Cited

U.S. PATENT DOCUMENTS

| | | | |
|---|---|---|---|
| 2004/0013170 A1 | 1/2004 | Fitzrandolph | |
| 2004/0239559 A1 | 12/2004 | King et al. | |
| 2013/0148763 A1* | 6/2013 | Gunawardena | H04B 1/10 375/340 |
| 2015/0271687 A1* | 9/2015 | Fechtel | H04W 24/02 370/252 |
| 2015/0365130 A1* | 12/2015 | Soualle | H04B 1/7107 370/335 |
| 2017/0170854 A1* | 6/2017 | Soualle | H04B 17/27 |

OTHER PUBLICATIONS

"GNSS Receiver Performance Augmentation with a Smart Adaptive Noise Blanker in Pulse-Free Environment", Dec. 3, 2014, Mathieu et al.
"Optimal Global Navigation Satellite System pulse blanking in the presence of signal quantisation", Apr. 1, 2013, Borio et al.

* cited by examiner

NOISE DISTRIBUTION SHAPING FOR SIGNALS, PARTICULARLY SPREAD SPECTRUM SIGNALS LIKE CDMA SIGNALS, WITH IMPROVED ROBUSTNESS

CROSS-REFERENCES TO RELATED APPLICATIONS

This application is a continuation of International Application PCT/EP2016/066151 filed Jul. 7, 2016, designating the United States and published on Jan. 26, 2017 as WO 2017/012887. This application also claims the benefit of the European patent application No. 15002130.1 filed on Jul. 17, 2015. The entire disclosures of the above are incorporated herein by way of reference.

TECHNICAL FIELD

The invention relates to noise distribution shaping for signals, particularly for the application in receivers for CDMA signals.

BACKGROUND OF THE INVENTION

Interferences on radio signals such as CDMA (Code Division Multiple Access) signals emitted by satellites of a GNSS (Global Navigation Satellite System) particularly occur in impulse noise environments such as in the neighborhood of vehicle ignition systems, power lines, heavy current switches or microwave ovens. The interferences occurring in these environments are usually emitted in bursts and, thus, cannot be modelled as Gaussian.

In order to reduce the effects of pulsed interferences on the reception of a radio signal, a (noise) blanker can be applied in a signal receiver. The blanker sets received signal samples to zero when they contain high power pulsed interferences. The typical blanker uses two fixed thresholds BTH+ and BTH−, which are symmetrical to zero (|BTH+|=|BTH−|). If a received signal sample contains interferences and exceeds a threshold, the sample is set to zero by the blanker. Typical receivers for CDMA signals are equipped with such a blanker.

In the absence of interference, which may be for some signals receivers a frequent situation, the blanker still operates and sets the portions of a received signal to zero, which are affected by large thermal noise samples (usually modelled as Gaussian). However, this may lead to an undesired reduction of the Signal-to-Noise and Interference Ratio (SNIR).

U.S. Pat. No. 7,260,163 B2 describes a noise blanker for application with a FM signal receiver of a radio as installed in a vehicle. In order to reduce the effect of ignition noise on a received FM signal, a noise controller is provided, which uses an all-pole prediction algorithm to replace a noise-corrupted signal segment. The all-pole prediction algorithm takes a sample of a previously demodulated signal and models a new demodulated signal segment using the all-pole prediction algorithm The algorithm uses a least means squared (LMS) algorithm to minimize error between the received original signal and the predicted signal.

European patent application no. 14290171.9, which is incorporated herein by reference and is considered as comprised in the state of the art according to Article 54(3) of the European Patent Convention, describes to offset either blanking thresholds or a received signal by an offset value. The main advantage of this blanking approach is seen in the suppression of the degradation of the SNIR of a received CDMA signal when there are no pulsed interferences and even an improvement of the SNIR. This blanking concept is also described in the publication "GNSS Receiver Performance Augmentation With a Smart Adaptive Noise Blanker in Pulse-Free Environment," Mathieu Cattenoz, Francis Soualle, "7th ESA Workshop on Satellite Navigation Technologies (NAVITEC)," 3-5 Dec. 2014 at the European Space Research and Technology Centre (ESTEC) in Noordwijk, The Netherlands.

SUMMARY OF THE INVENTION

It is an object of the present invention to further develop the blanking approach described in the European patent application no. 14290171.9, particularly to improve its application in multipath environments or with high dynamic or with high noisy environment.

In the above referenced European patent application no. 14290171.9, it is proposed to offset the positive and negative blanking thresholds with respect to the sign and amplitude of the tracked chips of a received signal, particularly a CDMA signal of for example a GNSS. Particularly, it is proposed to apply a positive (resp. negative) offset during the full duration of the positive (resp. negative) "chip." This may improve the SNIR provided that the delay of the received signal is nearly perfectly synchronized. The present invention is based on the finding that the blanking thresholds are synchronized to a received signal chip stream (whose amplitude is typically smaller than the standard deviation of the noise) only in an ideal situation, and that in reality a receiver of the signal does not know precisely when the exact chip transition occurs, but can only estimate it with tracking loops. A chip transition is the transition between two consecutive chips regardless of the polarity of the consecutive chips. As a consequence, in a real scenario the exact position of the chip transition will be known with the accuracy of the tracking loops. Such loops will consequently help triggering the positive or negative offset of both thresholds. Thus, the present invention proposes to determine zones or regions around chip transitions, where the use of a dedicated offset is applied differently than in the zones out-of-the chip transitions. For example, it may be provided that in the determined zones, no offset is applied so that the zones are a kind of "dead zones" where the nominal blanking thresholds are not offset. The size of a zone or region without offset could depend on the dynamic foreseen for the application type (which typically may differ for pedestrian or airborne users, for the example of a GNSS) but also the tracking accuracy. By introducing such zones around chip transitions, the invention based on the blanking approach described in the European patent application no. 14290171.9 becomes more robust in case of synchronization errors caused by noise, dynamic or multipath.

The present invention is based on the blanking approach described in the European patent application no. 14290171.9, which comprises offsetting either blanking thresholds or a received signal by an offset value. In particular, this offset value can depend on the amplitude of the received signal. For example, the amplitude of the received signal can be calculated based on the estimated power, Pest, of the received signal and its sign. Herein it is generally assumed that the amplitude of the signal can have a positive or a negative value. The offset value can be for example calculated by multiplying the square root of the estimated power with a predefined scaling factor α which can be positive or negative: α×sqrt(Pest). It has been found by the inventors that in case of CDMA signals, a scaling factor +1 or −1—so that the offset value is ±sqrt(Pest).—depending on the chip value, has advantageous effects.

This invention may be advantageously applied to signals with dominant noise content, such as CDMA coded signals, for example GNSS signals. The invention can be applied to signals before or after down-conversion into a baseband, for example after down-conversion and analog-to-digital conversion or directly after an analog-to-digital conversion before a down-conversion into a baseband. The invention can be applied to any kind of signal containing a significant proportion of noise.

Generally, an offsetting can be performed with the signal amplitude. In the special case of a CDMA signal, this offsetting can correspond to the chip amplitude±sqrt(Pest) with a scaling factor α=±1. The most important aspect is that the noise is dominant, i.e., has much larger power than the received signal power P, and therefore to its estimate Pest. In case of received CDMA signals, at least one blanking threshold may be adapted depending on the estimated received power and the binary chip value of the received CDMA signals. The binary chip value of a CDMA signal is known by a CDMA signal receiver a priori since the spreading sequence used to code the CDMA signal is constituted of a sequence of chips, which has to be known by a receiver for decoding and despreading the CDMA signal. In the following, and in the particular case of a CDMA signal, the estimated chip amplitude is ±sqrt(Pest) while the binary chip value is ±1.

The adaption of the at least one blanking threshold depending on the binary chip values of received CDMA signals modifies the noise distribution of the output of a blanker of a CDMA signal receiver. Instead of adapting blanking thresholds, the samples of the CDMA signals may be adapted, for example offset; then, the adapted CDMA samples may be compared with fixed blanking thresholds, and the noise distribution of the sampled CDMA signals may be modified by applying blanking An offsetting of the samples of CDMA signals may be performed by a value depending on the estimated chip amplitude of the CDMA signals. For example, the binary chip value scaled by the estimated amplitude of a received CDMA signal may be added or subtracted from samples of the received CDMA signal. Those samples are then fed to the blanker with non-offset thresholds. After the blanking operation, the offsetting of the samples of the CDMA signal can be removed.

Analytical and simulation work conducted for this invention has shown that this modification cannot only reduce the SNIR degradations caused by the blanking, but can even improve the SNIR by an optimized shaping of the noise distribution of a received CDMA signal.

Generally speaking, the invention extends from the concept of two blanking thresholds BTH+, BTH− with opposite values, as described above, to a set of N blanking thresholds BTH$\{i,k,n\}$ which "cuts" regions of the distribution of samples of a received signal, and particularly a CDMA signal, at the input of a blanker to improve again the SNIR. Here, i is the index of the channel processing the ith signal source among I sources, k is a time index and n is a threshold index, among N thresholds. Indeed, in case of CDMA signals, for each tracked CDMA signal a different chip sequence also called replica is used and therefore a different threshold should be applied to each time instant. The different blanking thresholds BTH$\{i,k,n\}$ do not have to be pairwise symmetrical with respect to zero for each signal i and time instant k, and their value can depend, for example in case of CDMA signal on the chip amplitude. For example, a set of scaling factors α$\{i,k,n\}$, which are functions of the received signal, time and threshold index, can be multiplied with the estimated power of the ith signal, so that the blanking thresholds, BTH$\{i,k,n\}$ are offset of pre-defined blanking thresholds values with α$\{i,k,n\}$×sqrt(Pest,i,k) as offset. In this former equation Pest depends on the received signal i and also of the time instant k.

Alternatively, it is also possible to consider a set of offset values applied to the received signal while keeping the blanking thresholds fixed. The set of offset values could depend on the signal i being tracked and on the time k. In that alternative implementation, the signal amplitude is offset by an offset value, while the blanking thresholds are kept fixed. The offset signal is fed to the blanker with non-offset thresholds. After blanking operation, the offset applied to the blanked signal can be removed.

The main advantage of the invention is the reduction of the degradation of the SNIR of a received CDMA signal when there are no pulsed interferences, and even an improvement of the robustness in case of synchronization errors caused for example by noise, dynamic or multipath.

It should be noted that the present invention can be applied to any kind of signals, particularly spread spectrum coded signal such as CDMA signals, particularly to BPSK (Binary Phase Shift Keying)- and BOC (Binary Offset Carrier)-modulated CDMA signals used by GNSS such as (NAVSTAR-) GPS (Global Positioning System) or the European GNSS Galileo. For BOC signals each chip with a single "plateau" (in case of for example a BPSK-modulated signal) is replaced by several smaller plateaus [+1, −1]. The present invention, which is presented for the transition of a for example BPSK-modulated signal single plateau, would apply to the transitions of the sub-plateaus of a BOC-modulated signal, or any other signal comprising transitions, like for example chirp radar signals, or continuous wave signals. In case of spread spectrum coded signals, the signal transitions are transitions between consecutive chips of a sequence of chips used for coding the signal. In the context of the present invention, a signal transition is generally understood as a transition between signal states in a time frame, like the transitions between bits, chips or the like of a sequence of bits or chips. Thus, signal transition can also occur between two consecutive signal states, particularly bits or chips, of the same polarity, not even of different polarity.

An embodiment of the present invention relates to a method for noise distribution shaping for signals comprising the acts of generating a blanking control signal by comparing a received signal comprising a sequence of with at least one blanking threshold, determining transitions of the received signal and zones around the determined transitions, and generating a transitions control signal comprising the determined transitions and zones, adapting the at least one blanking threshold or the received signal according to an offset value depending on the amplitude of the received signal and on the transitions control signal, and modifying the noise distribution of the received signal by applying blanking of the received signal under control of the blanking control signal.

The transitions may be determined by at least one tracking loop for tracking the received signal, for example a DLL (Delay Locked Loop) and/or a PLL (Phase Locked Loop).

The durations of the zones around the determined transitions may be set to a constant value. This means that the time between the start and the end of the zones is constant. For example, the constant value may be defined depending on the a priori accuracy of a tracking loop for tracking the received signal. Particularly, the constant value may be defined so to over bound the maximum expected error of a tracking loop, which is determined by the tracking accuracy. Alternatively, the durations of the zones around the determined transitions may be adapted during noise distribution shaping. This means that the zones durations may be variable and adapted to the accuracy of a tracking loop, preferably in real-time.

The generating of the blanking control signal may comprise setting the at least one blanking threshold within the zones around the determined transitions to a predefined value, which is selected such that the adapting of the at least one blanking threshold is interrupted within the zones. In other words, the adaptation of the blanking thresholds is "paused" within the zones, particularly the at least one blanking threshold is not offset within the zones.

Alternatively, the generating of the blanking control signal may comprise interrupting the adapting of the received signal (samples) within the zones around the determined transitions so that the samples of the received signal are not offset within the zones, and are still fed to the at least one blanking threshold having a predefined value. Here, the adaptation of the received spread spectrum signal "samples" is "paused" within the zones.

Alternatively to determining transitions of the received signal for every signal state regardless of the polarities, it is possible to determine transitions of the received signal and zones around the determined transitions only for consecutive signal states of different polarity. Thus, for consecutive signal states (chips in case of a spread spectrum coded signal) of the same polarity no zone would be determined and, consequently, the adaptation of the at least one blanking threshold would have not to be "paused" or interrupted during a transition between such signal states. In other words, the adaptation of the at least blanking threshold would only be paused or interrupted during transitions between consecutive signal states of different polarity.

The amplitude of the received signal can be calculated based on the estimated power Pest of the received signal and the offset value can be calculated from the calculated amplitude of the received signal, particularly by multiplying the square root of the estimated power Pest with a predefined scaling factor α. Particularly, the predefined scaling factor α can be positive or negative, constant or time dependent, or the sign of the predefined scaling factor α can change over time as function of the received signal.

The act of adapting of the at least one blanking threshold or adapting the received signal, respectively, according to an offset value depending on the amplitude of the received signal may comprise offsetting at least one predefined blanking threshold or the received signal, respectively, with the scaled estimated amplitude of the received signal. For example, the amplitude scaled by a coefficient, may be added or subtracted from the at least one blanking threshold without modifying the received signal or may be added or subtracted from the amplitude of the received signal without modifying the blanking threshold.

The act of modifying the noise distribution of the received signal by applying blanking under control of the blanking control signal may comprise setting a sample of the received signal to a predefined value depending on the blanking control signal. Particularly, samples of the received signal, which exceed the blanking thresholds, may be set to 0. A set of blanking thresholds may be used, wherein the set comprises at least one blanking threshold for each one of a plurality of received signals. This allows using different blanking thresholds for different received signals.

The received signal may be a CDMA signal, and the offset value may be calculated by multiplying the square root of the estimated power Pest with a scaling factor being +1 or −1 depending on the chip values of the CDMA signal.

The adapting of the received signal depending on the amplitude of the received signal may be performed in the digital domain after an analog to digital conversion of the samples of the received signal.

A further embodiment of the invention relates to a computer program, which implements the method for noise distribution shaping for signals according to the invention and as described herein and enabling noise distribution shaping for signals according to the invention when executed by a computer. Such a computer program could be used by a computer equipped with a receiver comprising an antenna for receiving different signals, for example CDMA signals from satellites of a GNSS, enabling the computer to improve the SNIR of the received signals by applying the inventive noise blanking method.

According to a further embodiment of the invention, a record carrier storing a computer program according to the invention may be provided, for example a CD-ROM, a DVD, a memory card, a diskette, or a similar data carrier suitable to store the computer program for electronic access.

A yet further embodiment of the invention relates to device for noise distribution shaping for signals comprising means for generating a blanking control signal by comparing a received signal comprising transitions with at least one blanking threshold, means for generating a transitions control signal depending on determined transitions of the received signal and zones around the determined transitions, means for adapting the at least one blanking threshold or the received signal according to an offset value depending on the amplitude of the received signal and on the transitions control signal, and means for modifying the noise distribution of the received signal by applying blanking of the received signal under control of the blanking control signal.

The means for generating transitions control signal may be configured to set the durations of zones around the determined transitions to a constant value.

The means for generating a transitions control signal may be configured to select the constant value of the zones durations depending on the accuracy of a tracking loop for tracking the received signal.

Alternatively, the means for generating transitions control signal may be configured to adapt the durations of the zones around the determined transitions during noise distribution shaping.

The means for generating a blanking control signal may be configured to set the at least one blanking threshold within the zones around the determined transitions to a predefined value, which is selected such that the adapting of the at least one blanking threshold is interrupted within the zones. In other words, the adaptation of the blanking thresholds is "paused" within the zones, or the at least one blanking threshold is not offset within the zones.

Alternatively, means for generating a blanking control signal may be configured to interrupt the adapting of the received signal (samples) within the zones around the determined transitions so that the samples of the received signal are not offset within the zones, and are still fed to the at least one blanking threshold having a predefined value. Here, the means for generating a blanking control signal "pause" the adaptation of the received spread spectrum signal within the zones.

The means for adapting may be further configured to calculate the amplitude of the received signal based on the estimated received power Pest of the received signal and to calculate the offset value from the calculated amplitude of the received signal, particularly by multiplying the square root of the estimated power Pest with a predefined scaling factor α. Particularly, the predefined scaling factor α can be positive or negative, constant or time dependent, or the sign of the predefined scaling factor α can change over time as function of the received signal.

The means for generating a blanking control signal may comprise a comparator circuit with a first input for receiving signal samples and at least one second input for receiving the at least one blanking threshold.

The means for adapting the at least one blanking threshold or adapting the received signal, respectively, according to an offset value which depends on the amplitude of the received signal may comprise means for offsetting the at least one predefined blanking threshold or the received signal, respectively, with the scaled amplitude of the received signal.

The means for modifying the noise distribution of the received signal by applying blanking of the received signal under control of the blanking control signal may comprise means for setting a sample of the received signal to a predefined value depending on the blanking control signal. Particularly, samples of the received signal, which exceed the blanking thresholds, may be set to 0.

The device may be configured to use a set of blanking thresholds, wherein the set comprises at least one blanking threshold for each one of a plurality of received signals.

The means for generating a transitions control signal may be configured to only determine transitions of the received signal and zones around the determined transitions for consecutive signal states of different polarity.

The received signal may be a CDMA signal, and the means for adapting may be configured to calculate the offset value by multiplying the square root of the estimated power Pest with a scaling factor being +1 or −1 depending on the chip values of the CDMA signal.

A yet further embodiment of the invention relates to a GNSS receiver circuitry comprising an analog to digital converter for generating samples of received CDMA signals, a plurality of noise distribution shapers for modifying the noise distribution of the sampled CDMA signals according to the invention and as described herein, and a GNSS signal processor for processing the sampled CDMA signals output by the noise distribution shapers and for outputting chip values of the processed CDMA signals.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION OF THE PREFERRED EMBODIMENTS

In the following, functionally similar or identical elements may have the same reference numerals. Absolute values are shown below by way of example only and should not be construed as limiting the invention. Even if the following description of the invention is applied to CDMA signals of a GNSS, it should be noted that the invention can generally be applied to any kind of signal comprising transitions and is, therefore, not restricted to CDMA signals.

The blanking disclosed in the before mentioned European patent application no. 14290171.9 applies blanking thresholds $BTH^+$ and $BTH^-$ with the following values:

$$BTH^+ = \alpha \times (sqrt(P_{est})) \times c(t) + B0$$

$$BTH^- = \alpha \times (sqrt(P_{est})) \times c(t) - B0$$

Where c(t) equals +1 or −1 according to the chip polarity, α is a scaling factor for example 1, $P_{est}$ is the estimated power, B0 the blanking threshold without offset (as for a conventional receiver). B0 can be set for example to 0.5× $\sigma_{noise}$ where $\sigma_{noise}$ represents the standard deviation for the thermal noise.

Both thresholds are synchronized to the received GNSS signal chip stream (whose amplitude is typically smaller than the standard deviation of the noise), which represents an ideal situation. In reality, a GNSS receiver does not know when the exact chip transition occurs, but can only estimate it thanks to tracking loops (DLL, possibly aided with a PLL). Such loops will consequently allow determining the positive or negative offset of both thresholds, according to the estimated polarity of the spreading sequence. As a consequence, in a real scenario the exact position of the chip transition will be known with the accuracy of the tracking loops.

Now, at a low Carrier-to-Noise Spectral Density Ratio (C/N$_0$) the corresponding tracking loop performance will consequently influence the setting of the thresholds.

Furthermore, in case of high dynamic, the delay locked loop (and possibly the phase locked loop) might not react quickly enough and, as a consequence, the offset "transition" might be delayed with respect to the actual/true chip transition of the received signal. As a consequence, some of the decisions to blank or not some of the samples might not be optimal around those chip transitions.

Finally, in presence of multipath and especially strong static multipath, the "delayed multipath" signal will also delay the chip transition, which might also degrade the optimal setting of the thresholds offset if the loops are sensitive to the corresponding additional multipath signal.

Figure 1:
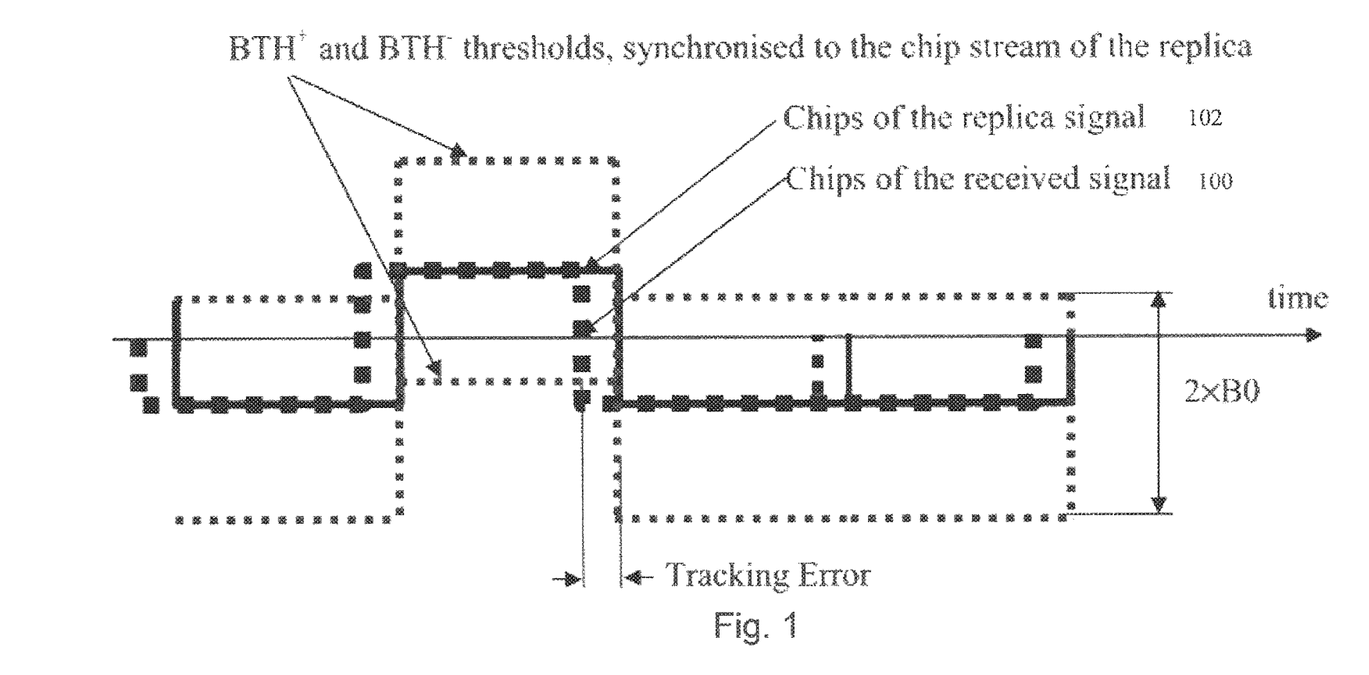
FIG. 1 shows a diagram of a chip stream for a received and a replica signal, when the tracking error is non-zero.
Figure 2:
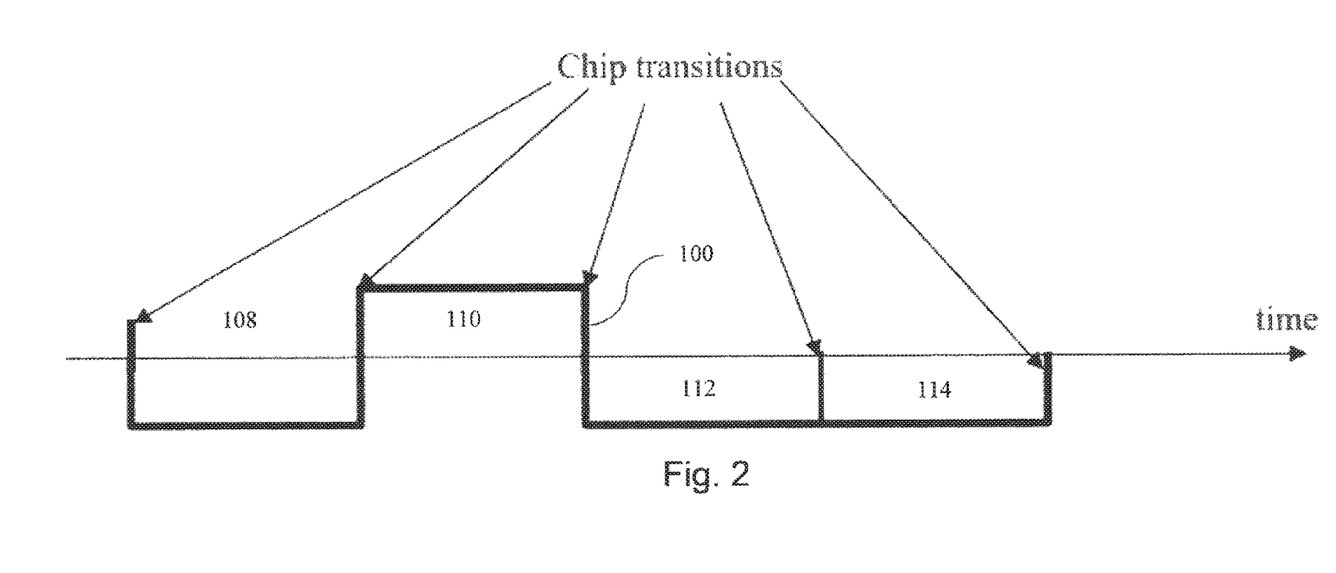
FIG. 2 shows a diagram of the chip stream for the received signal from FIG. 1 with the chip transitions between consecutive chips.

FIG. 1 represents the chip stream for the received signal 100 and the replica signal 102, when the tracking error is non-zero. The two blanking thresholds $BTH^+$ and $BTH^-$ are also represented in dashed lines and are synchronized to the replica signal 102. The tracking error is caused either by thermal noise, or by the dynamic or both dynamic and thermal noise. FIG. 2 shows only the chip stream for the received signal 100 with the transitions between consecutive chips (chip transitions). As it can be seen, a chip transition occurs also between consecutive chips 112 and 114 of the same polarity.

Figure 3:
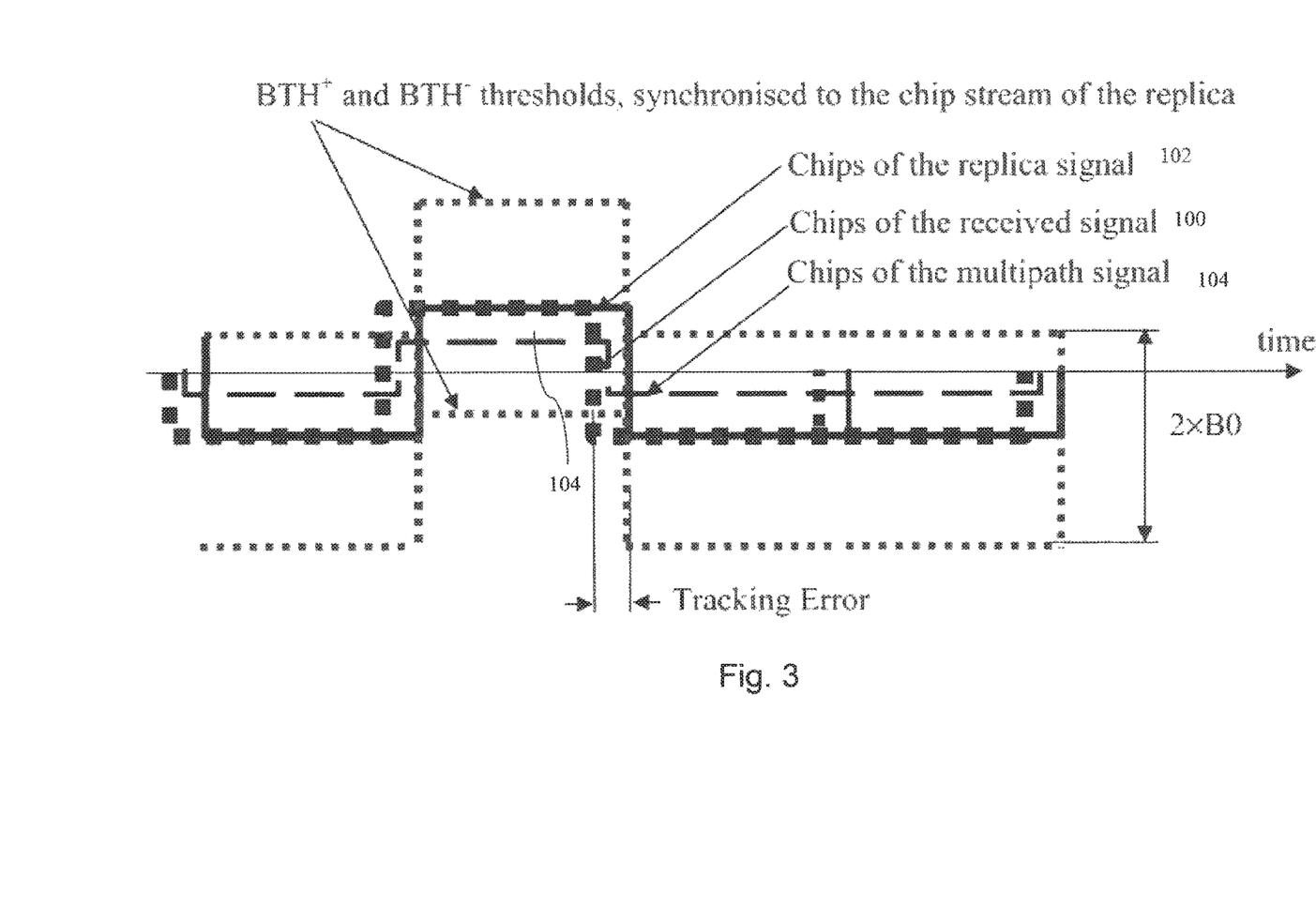
FIG. 3 shows the diagram of FIG. 1 with an additional multipath signal which will superimpose onto the received signal.

FIG. 3 additionally represents a multipath signal 104 which will superimpose onto the received signal 100 (but not onto the replica).

Figure 4:
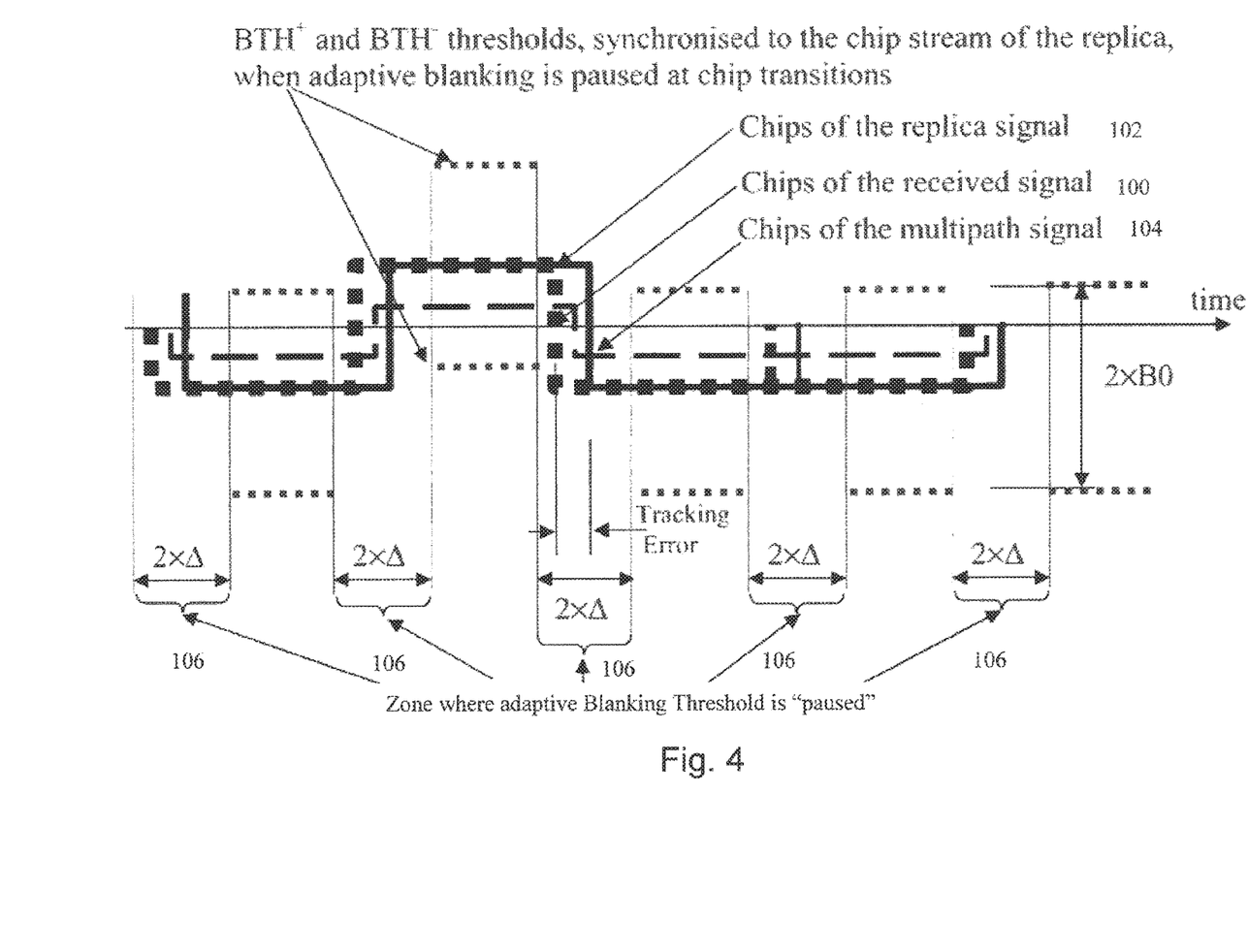
FIG. 4 shows the diagram of FIG. 1 with a modified blanking threshold, which is "paused" within zones around each chip transition according to the invention.
Figure 5:
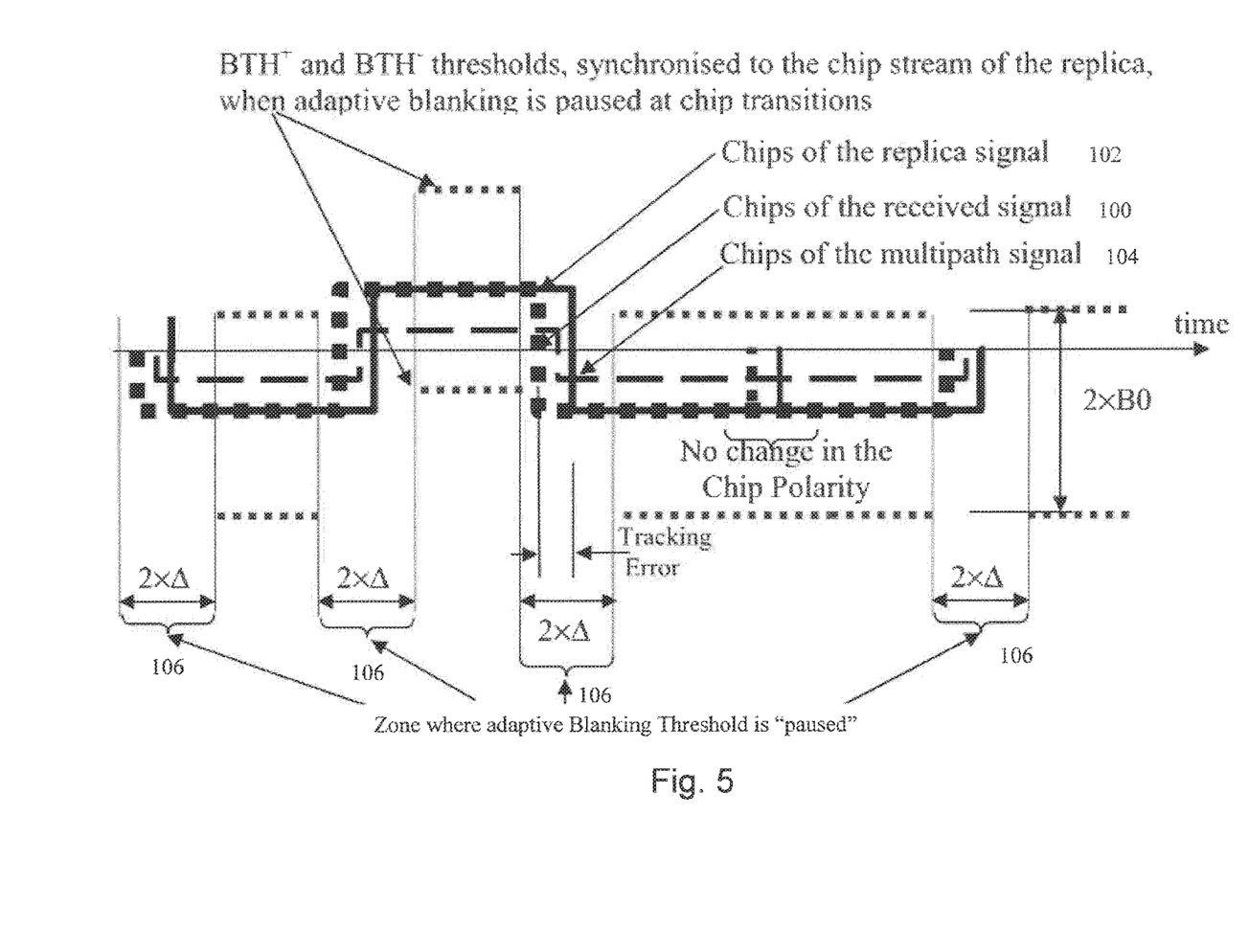
FIG. 5 shows the diagram of FIG. 1 with a modified blanking threshold, which is "paused" within zones around the chip transitions between consecutive chips of different polarity according to the invention.

All of the reasons motivated the inventors to introduce a zone around the chip transition where no offset, or even no blanking (to do that one solution comprises raising the blanking threshold to a very large value) shall be applied. FIGS. 4 and 5 represents the modified blanking thresholds, by introducing a zone where no blanking is applied. The width of this zone is $2 \times \Delta$. Hence during the period $2 \times \Delta$ around the chip transition, no offsetting of the blanking thresholds is used. It has to be highlighted that the de-activation of the threshold offsetting can also apply at the chip transitions even if the consecutive chip values are identical (same polarity) or not. Alternatively, it is also possible to de-active the threshold offsetting around the chip transition only when the polarity of consecutive chips is opposite. The width $2 \times \Delta$ can be adapted during receiver operation. For example, if the receiver contains any multipath detection function, which can monitor the multipath environment and confirm the absence of multipath, the $2 \times \Delta$ could be set very low or even suppressed (no offset de-activation). Similarly, if the receiver works at an higher ($C/N_0$) or in absence of dynamic during a given period of time, again the $2 \times \Delta$ could be set very low or even suppressed. Consequently, the width $2 \times \Delta$ can be for example adapted by the tracking loops. Of course, it can also be set constant as a configuration parameter of the receiver and particularly the adaptive blanker. In FIG. 4, each chip transition comprises a zone 106, within the offsetting of the blanking threshold is "paused" or interrupted, also within the zone around the chip transition between two consecutive chips with the same polarity. However, it is also possible to not "pause" or interrupt the offsetting of the blanking threshold between two consecutive chips of the same polarity, as shown in the diagram of FIG. 5.

Figure 6:
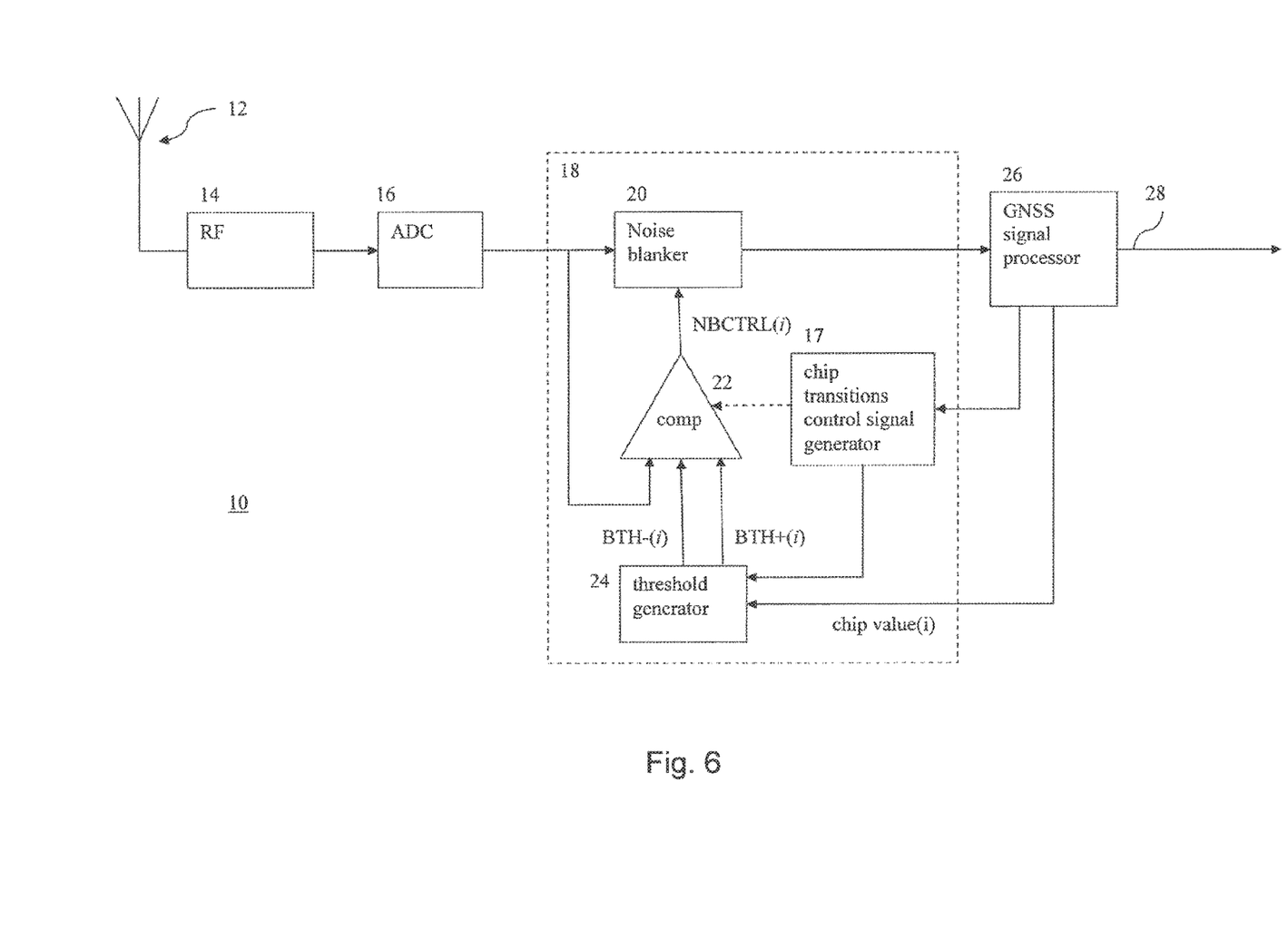
FIG. 6 shows an embodiment of a GNSS receiver circuitry with a noise distribution shaper according to the invention.

FIG. 6 shows a block diagram of a GNSS receiver circuitry 10 comprising a noise distribution shaper according to the invention. The shown circuitry 10 comprises a RF front end circuitry 14 for filtering and down converting CDMA signals received from GNSS signals into a baseband for further processing, an ADC (Analog to Digital Converter) 16 for sampling the down converted CDMA signals (an AGC (Automatic Gain Control) (not shown) can be placed between the RF front end circuitry 14 and the ADC 16) and converting the analog samples of the CDMA signals into digital values, a noise distribution shaper 18 according to the invention for shaping the noise distribution of the digitized CDMA signal samples of one of the plurality of the received CDMA signals, and a GNSS signal processor 26 for correlating the received CDMA signals with spreading sequences or chip values used to encode the CDMA signals and processing the CDMA signals for determining and outputting positioning data 28. It should be noted that the noise distribution shaping can also be applied directly in RF, and is therefore not restricted to the baseband as described before.

In the following, the implementation of the noise distribution shaper 18 is described in detail. The digitized CDMA samples output by the ADC 16 are input to a blanker 20 and an input of a comparator circuit 22. The comparator circuit 22 further receives a first adaptive blanking threshold BTH−(i) and a second adaptive blanking threshold BTH+(i), which are both output from a blanking threshold generator 24. The adaptive blanking thresholds BTH−(i) and BTH+(i) are assigned to one signal (index i) of the plurality of the I received CDMA signals. In other words, each received CDMA signal usually has its own dedicated adaptive blanking thresholds. Also, less or more than two adaptive blanking thresholds may be provided. Furthermore, for each chip value taken at instant k, the blanking thresholds BTH−(i) and BTH+(i) will be modified according to this binary chip value. Now the time dependency is considered implicitly in the example to ease readability.

The blanking threshold generator 24 receives from the GNSS signal processor 26 the chip values, which are used by the processor to decode and despread the received CDMA signals. For example, if the processor 26 is able to decode four (I=4) CDMA signals among the plurality of received CDMA signals, it outputs the four chip values corresponding to the spreading sequences assigned to the four received CDMA signals and used to decode them by the processor 26. It should be noted that in such case four different adaptive blanking threshold generators 24 are required since each block will be adapted to the chip value of each sequence (in FIG. 6, only one generator block 24 is shown).

The blanking threshold generator 24 receives a chip transitions control signal, which is generated by a chip transitions control signal generator 17. The generator 17 receives from the GNSS signal processor 26 a signal indicating the estimated transitions of chips and a tracking error of the real GNSS signal. The GNSS signal processor 26 can estimate the chip transitions with a tracking loop, preferably a DLL as it may be used in the signal processor to track the received GNSS signal. In addition to the DLL, a PLL may be used, which can also be applied to estimate the chip transitions. From the signal indicating estimated transitions of chips in a received GNSS signal and the tracking error of an applied tracking loop, the generator 17 generates and outputs the chip transitions control signal containing the zone duration $2 \times \Delta$ around each estimated chip transition to the threshold generator 24, wherein the width of the zone can vary depending on the dynamic foreseen of the application type, for example it can differ for pedestrian and airborne users. Furthermore, in case two consecutive chips have the same polarity ('+|+' or '−|−'), the width of the duration of zone around the chip transition can be set to 0, meaning that the offset of the blanking threshold is still applicable for such transitions with identical chip polarity or equivalently that the de-activation of the offset is cancelled.

The blanking threshold generator 24 generates with the received chip values the first adaptive blanking threshold BTH−(i) and the second adaptive blanking threshold BTH+(i). The blanking thresholds BTH+(i) and BTH−(i) may be generated by offsetting predefined blanking thresholds $BTH_{pre}+$ and $BTH_{pre}-$ with the scaled amplitude of the respective CDMA signal i. The amplitude of the offsets applied to the predefined blanking thresholds $BTH_{pre}+$ and $BTH_{pre}-$ are calculated from the estimated power ($P_{est}$) of the received signal based on the samples provided by the Analog-to-Digital Converter (ADC), from block 16, multiplied with a scaling factor also function of the binary chip value. Two scaling factors $\alpha+$ and $\alpha-$ are respectively deduced for the positive and negative chip value. The predefined blanking thresholds $BTH_{pre}+$ and $BTH_{pre}-$ may be for example selected depending on the environment of operation of the GNSS receiver and particularly be configured depending on the occurrence of pulsed interferences such as generated by vehicle ignition systems, power lines, heavy current switches or microwave ovens. For example, in an environment with strong pulsed interferences, such as in the neighborhood of vehicle ignition systems or power lines, the predefined blanking thresholds may be set with a higher value than in environments with weaker pulsed interferences. For the selection of predefined blanking thresholds suitable for a certain environment, the strength and frequency of occurrence of pulsed interferences in the received CDMA signals may be determined, and depending thereon suitable predefined blanking thresholds may be determined.

The offsetting of the predefined blanking thresholds $BTH_{pre}+$ and $BTH_{pre}-$ may comprise adding the estimated received power $P_{est}$ multiplied with a positive scaling factor $\alpha_+$ for positive chip value, or adding the estimated received power $P_{est}$ multiplied with a scaling negative factor $\alpha_-$ for negative chip value:

Hence for positive chip values the adapted blanking thresholds are given by:

$$BTH-(i)=BTH_{pre}-+\alpha_+(i)(\text{sqrt}(P_{est}))$$

$$BTH+(i)=BTH_{pre}++\alpha_+(i)(\text{sqrt}(P_{est}))$$

And for negative chip values the adapted blanking thresholds are given by:

$$BTH-(i)=BTH_{pre}-+\alpha_-(i)(\text{sqrt}(P_{est}))$$

$$BTH+(i)=BTH_{pre}++\alpha_-(i)(\text{sqrt}(P_{est}))$$

The offsetting of the predefined blanking thresholds $BTH_{pre}+$ and $BTH_{pre}-$ is further controlled by the chip transitions control signal received from the chip transitions control signal generator 17. During the zone of duration 2×Δ around each estimated chip transition as indicated by the chip transitions control signal, the blanking threshold generator 24 sets the adaptive blanking thresholds BTH+(i) and BTH−(i) to $\beta \times BTH_{pre}+$ and $\beta \times BTH_{pre}-$, where β is a scaling factor. By doing this the blanking threshold is applied without offset.

Hence during the zone duration 2×Δ the blanking thresholds are given by:

$$BTH-(i)=\beta \times BTH_{pre-} \text{ and } BTH+(i)=\beta \times BTH_{pre+}$$

for both positive and negative chip values

An alternatively scheme for the zone around the chip transition could be:

For positive chip values the blanking thresholds are given by:

$$BTH-(i)=-LVAL$$

$$BTH+(i)=+LVAL$$

And for negative chip values the blanking thresholds are given by:

$$BTH-(i)=-LVAL$$

$$BTH+(i)=+LVAL$$

LVAL is a large value, which is selected such that the amplitudes of CDMA samples of CDMA signal i do not exceed LVAL. By doing this the blanking is deactivated during the zone around the chip transition.

Alternatively to considering the chip transitions control signal supplied to the threshold generator 24, the chip transitions control signal may also be directly supplied to the comparator circuit 22, as outlined in FIG. 6 by the dashed arrow from block 17 to block 22. Then the supply of chip transition supplied from block 17 to block 24 would not be necessary. Then, the comparator circuit 22 directly processes the chip transitions control signal when generating a blanking control signal NBCTRL(i) as described in the following.

The adaptive blanking thresholds BTH+(i) and BTH−(i) are sent to second inputs of the comparator circuit 22, which receives on its first input the digitized CDMA samples from the ADC 16. The comparator circuit 22 compares the amplitudes (algebraic values) of the digitized CDMA samples with the adaptive blanking thresholds BTH+(i) and BTH−(i) and generates depending on the comparison the blanking control signal NBCTRL(i), which controls the blanker 20.

The comparator circuit 22 may generate the blanking control signal NBCTRL(i) for example as follows:

amplitudes of CDMA samples of CDMA signal
$i>BTH+(i)\to NBCTRL(i)=+1$ amplitudes of CDMA samples of CDMA signal
$i<BTH-(i)\to NBCTRL(i)=-1$ amplitudes of CDMA samples of CDMA signal
$i<BTH+(i)$ and $>BTH-(i)\to NBCTRL(i)=0$ The blanker 20 sets the samples of the CDMA signals received at its input to a predefined value such as zero as long as the noise blanking control signal NBCTRL(i) is +1 or −1, and passes the received digitized CDMA signals from its input to its output if the blanking control signal NBCTRL(i) is 0.

During an indicated chip transition (for example by means of the chip transitions control signal from the generator 17 or immediately via the adaptive blanking thresholds BTH+(i) and BTH−(i) from the threshold generator 24 if the comparator 22 does not receive the chip transitions control signal), the comparator circuit 22 outputs a blanking control signal NBCTRL(i), which is either 0 without any blanking (which is equivalent to setting the adaptive blanking thresholds BTH+(i) and BTH−(i) to a very large value) or +1/−1 with blanking (in the case of the offsetting of the blanking thresholds BTH+(i) and BTH−(i) is not applied, and those thresholds equals $BTH-(i)=\beta \times BTH_{pre-}$ and $BTH+(i)=\beta \times BTH_{pre+}$).

The above example is given for two blanking thresholds BTH+ and BTH− (N=2). In the following, a brief example for the case of a larger N=4 for a CDMA signal i is given (hereby BTH(n, i) means blanking threshold n for CDMA signal i):

CDMA signal $i<BTH(1,i)\to NBCTRL(i)=+1$.

$BTH(1,i)<$CDMA signal $i<BTH(2,i)\to NBCTRL(i)=0$.

$BTH(2,i)<$CDMA signal $i<BTH(3,i)\to NBCTRL(i)=+1$.

CDMA signal $i>BTH(4,i)\to NBCTRL(i)=+1$.

Again the proposed control low for the NBCTRL(i) based on a comparison with the 4 thresholds is just one example. The blanking control signal for the blanking thresholds BTH(n, i) is adapted for the $i^{th}$ tracked CDMA signal among I signals. As a consequence, as many blanking blocks as there are tracked signals (I) are required. Alternatively, a single control block fed with the different chip values for the I CDMA signals can be provided. However, this single control block must then be able to handle the blanking thresholds BTH(n, i) for the $i^{th}$ CDMA signal, for example by applying multiplexing inside the block.

Figure 7:
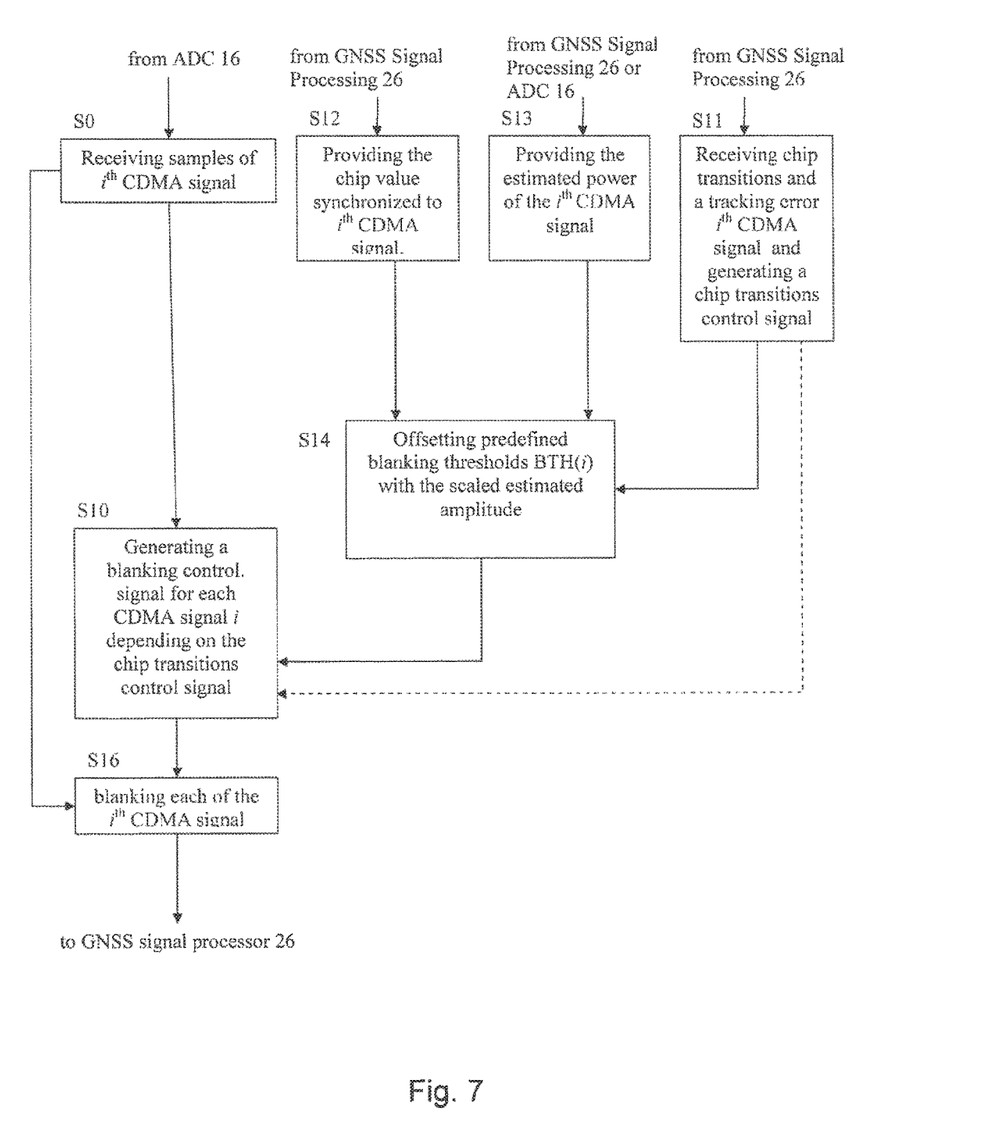
FIG. 7 shows a flow chart of an embodiment of a noise distribution shaping method for CDMA signals according to the invention.

FIG. 7 shows a flowchart of a method for noise distribution shaping for I CDMA signals according to the invention, which can be implemented as a computer program to be executed by a processor. The term "steps" used in the following description does not mean that the steps are performed in a certain sequence, since the single steps can also be performed in parallel. Thus, "steps" must be understood as "acts performed by the method."

The method receives in step S0 digitized CDMA signal samples of the $i^{th}$ CDMA signal from the ADC 16. In step S11, the method receives chip transitions and a tracking error of the $i^{th}$ CDMA signal and generates a chip transitions control signal. In step S12, the chip values of the $i^{th}$ CDMA signal are provided, which are known a priori and stored in a memory. In step S13 the $i^{th}$ CDMA signal from the ADC 16 is provided in order to estimate the power of the $i^{th}$ received signal. The scaled estimated chip amplitudes are then used in step S14 to offset predefined blanking thresholds $BTH_{pre}(i)$ to generate a set of blanking thresholds BTH+(i) and BTH−(i) for each CDMA signal. The offsetting in step S14 can be performed depending on the chip transitions control signal provided through step S11: during each estimated chip transition, a zone with a duration 2×Δ is defined around each estimated chip transition and, during each zone, the blanking thresholds BTH+(i) and BTH−(i) for each CDMA signal i are set to a predefined value, which is selected such that the adapting of the at least one blanking threshold is interrupted within the zones, while "out of the chip transition zones" the blanking thresholds BTH(i) for each CDMA signal are offset with the scaled estimated amplitude. With the set of blanking thresholds BTH(i) and the received digitized CDMA signal samples, the method generates in step S10 a blanking control signal for each CDMA signal i, for example by a comparison as described above. Alternatively, the offsetting in step S14 can be performed without considering the chip transitions control signal (in fact, the chip transitions control signal generated in step S11 must not be provided to step S14) and the chip transitions control signal can be directly provided through step S11 to step S10 (dashed arrow from step S11 to step S10 in FIG. 7). Then, the chip transitions control signal is used for the generation of the blanking control signal, namely for interrupting or pausing the adapting of the received spread spectrum coded signal within the zones around the determined chip transitions as described above. In step S16, the noise distribution of the received samples of the $i^{th}$ CDMA signal is shaped by a blanking process controlled by the $i^{th}$ blanking control signal generated in step S10. The CDMA signal samples with shaped noise distribution are finally output to the GNSS signal processor 26 for further processing.

Simulations performed by the inventors have shown that by introducing the corresponding zones around the chip transitions for the blanker, the improvement in $(C/N_0)$ is reduced with respect to the case with blanking thresholds permanently offset but still much better than the case without adaptive blanking thresholds. Despite this reduction in absolute $(C/N_0)$ improvement, the corresponding receiver will gain in robustness for low $(C/N_0)$, high dynamic and strong multipath environments.

The present invention constitutes an extension of the blanking approach disclosed in the European patent application no. 14290171.9. It extends the range of applicability, especially for typical environment with multipath or for receiver having large dynamic.

The present invention allows reducing the degradation of the SNIR of a received signal, particularly a CMDA signal, when there are no pulsed interferences, by offsetting the blanking thresholds or the signal depending on the amplitude of the signal, for example with the scaled amplitude (the amplitude can be positive or negative according to the chip value) of a received CDMA signal, and by comparing the amplitude (algebraic value) of samples of the received signal to the blanking thresholds. The present invention can be used for receivers for navigation and communication applications. In general, the invention is of interest for all terrestrial or space based applications in telecommunication, or more generally for all kinds of signal transmissions where the signal is buried in high-level noise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS AND ACRONYMS

10 GNSS receiver circuitry
12 antenna
14 RF front end circuitry
16 ADC
17 chip transitions control signal generator
18 noise distribution shaper
20 blanker
22 comparator circuit
24 blanking threshold generator
26 GNSS signal processor
28 GNSS output data
100 received GNSS signal
102 replica GNSS signal
104 multipath signal
106 zones around chip transitions for "pausing" or interrupting of the offset of the blanking threshold
108-114 consecutive chips
ADC Analog to Digital Converter
BTH Blanking Threshold
CDMA Code Division Multiple Access
$C/N_0$ Carrier-to-Noise Spectral Density Ratio
GNSS Global Navigation Satellite System
DLL Delay Locked Loop
NBCTRL Noise Blanking Control
PLL Phase Locked Loop
RF Radio Frequency
SNIR Signal-to-Noise and Interference Ratio

The invention claimed is:
1. A method for noise distribution shaping for signals comprising the acts of
generating a blanking control signal by comparing a received signal comprising transitions with at least one blanking threshold, determining transitions of the received signal and zones around the determined transitions, and generating a transitions control signal comprising the determined transitions and zones, adapting the at least one blanking threshold or the received signal according to an offset value depending on the amplitude of the received signal and on the transitions control signal, and modifying the noise distribution of the received signal by applying blanking of the received signal under control of the blanking control signal.

2. The method of claim 1, wherein the transitions are determined by at least one tracking loop for tracking the received signal.

3. The method of claim 1, wherein the durations of the zones around the determined transitions are set to a constant value.

4. The method of claim 3, wherein the constant value is selected depending on the accuracy of a tracking loop for tracking the received signal.

5. The method of claim 1, wherein the durations of the zones around the determined transitions are adapted during the entire process of the noise distribution shaping.

6. The method of claim 1, wherein the generating of the blanking control signal comprises setting the at least one blanking threshold within the zones around the determined transitions to a predefined value, which is selected such that the adapting of the at least one blanking threshold is interrupted within the zones, or interrupting the adapting of the received signal within the zones around the determined transitions.

7. The method of claim 1, wherein transitions of the received signal and zones around the determined transitions are only determined for consecutive signal states of different polarity.

8. A device for noise distribution shaping for signals comprising means for generating a blanking control signal by comparing a received signal comprising transitions with at least one blanking threshold, means for generating a transitions control signal depending on determined transitions of the received signal and zones around the determined transitions, means for adapting the at least one blanking threshold or the received signal according to an offset value depending on the amplitude of the received signal and on the transitions control signal, and means for modifying the noise distribution of the received signal by applying blanking of the received signal under control of the blanking control signal.

9. The device of claim 8, wherein the means for generating a transitions control signal are configured to set the durations of the zones around the determined transitions to a constant value.

10. The device of claim 9, wherein the means for generating a transitions control signal are configured to select the constant value of the zones durations depending on the accuracy of a tracking loop for tracking the received signal.

11. The device of claim 8, wherein the means for generating a transitions control signal are configured to adapt the durations of the zones around the determined transitions during noise distribution shaping.

12. The device of claim 8, wherein the means for generating a blanking control signal are configured to set the at least one blanking threshold within the zones around the determined transitions to a predefined value, which is selected such that the adapting of the at least one blanking threshold is interrupted within the zones, or to interrupt the adapting of the received signal within the zones around determined transitions.

13. The device of claim 8, wherein the means for generating a transitions control signal are configured to only determine transitions of the received signal and zones around the determined transitions for consecutive signal states of different polarity.

14. The device of claim 8, wherein the received signal is a CDMA signal, specifically a BSPK or BOC modulated binary signal, and the means for adapting are configured to calculate the offset value by multiplying the square root of the estimated power Pest with a scaling factor being +1 or −1 depending on the chip values of the CDMA signal.

15. A GNSS receiver circuitry comprising an analog to digital converter for generating samples of received CDMA signals, a plurality of noise distribution shapers for modifying the noise distribution of the sampled CDMA signals, each noise distribution shaper being a device for noise distribution shaping for signals according to claim 8, and a GNSS signal processor for processing the sampled CDMA signals output by the noise distribution shapers and for outputting chip values of the processed CDMA signals.

* * * * *